Figure 1:
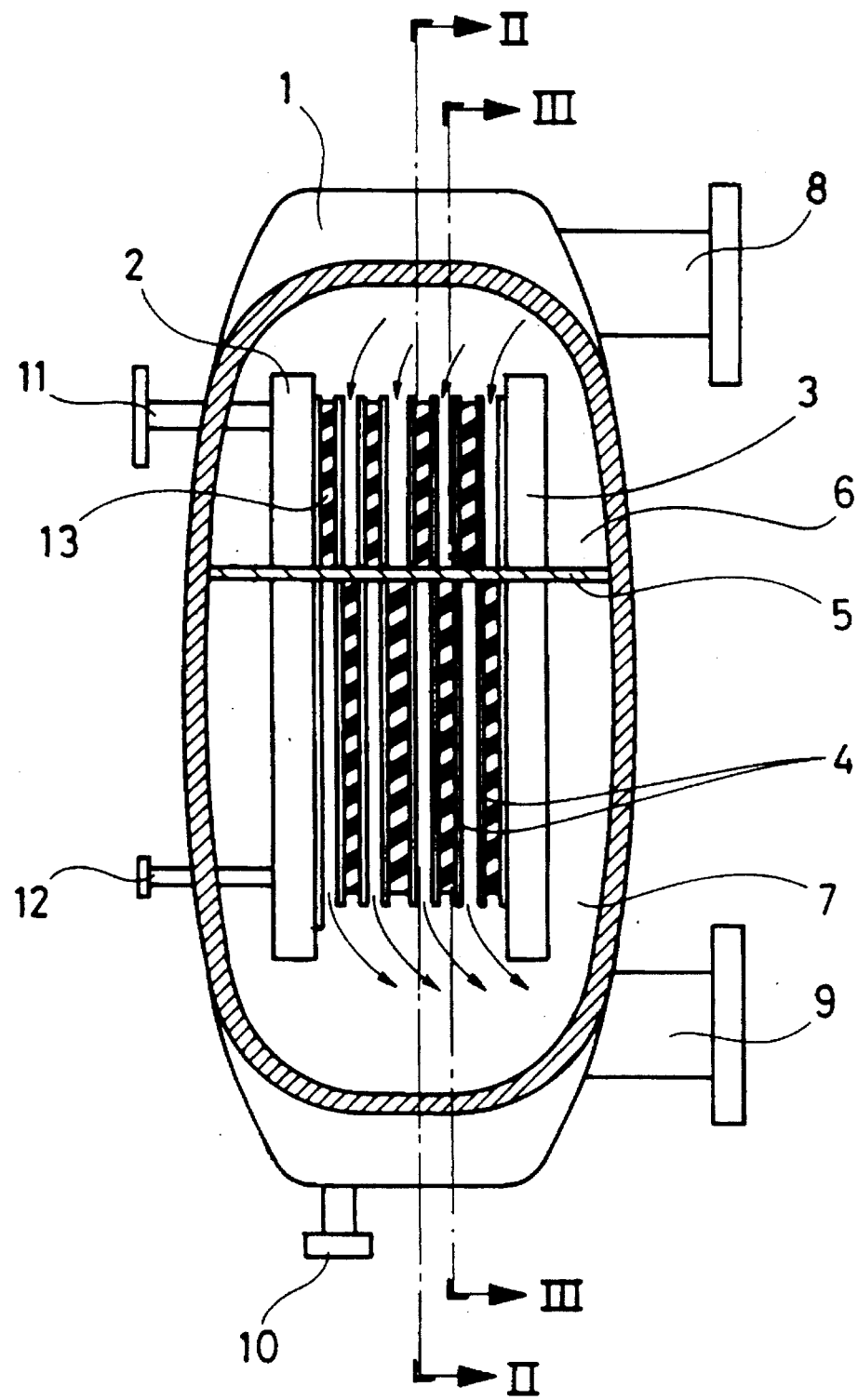

United States Patent [19]

Hallgren

[11] Patent Number: 5,509,471
[45] Date of Patent: Apr. 23, 1996

[54] DISTRIBUTION PATTERN OF A PLATE HEAT EXCHANGER

[75] Inventor: Leif Hallgren, Lund, Sweden

[73] Assignee: Alfa Laval Thermal AB, Lund, Sweden

[21] Appl. No.: 256,610

[22] PCT Filed: Jan. 20, 1993

[86] PCT No.: PCT/SE93/00027

§ 371 Date: Oct. 19, 1994

§ 102(e) Date: Oct. 19, 1994

[87] PCT Pub. No.: WO93/14363

PCT Pub. Date: Jul. 22, 1993

[30] Foreign Application Priority Data

Jan. 21, 1992 [SE] Sweden ................................. 9200166

[51] Int. Cl.$^6$ ................................. F28F 3/10; B01D 1/22
[52] U.S. Cl. ........................ 165/167; 159/28.6; 202/236
[58] Field of Search ........................ 165/167; 159/13.1, 159/28.6; 202/235, 236

[56] References Cited

U.S. PATENT DOCUMENTS

| 4,162,703 | 7/1979 | Bosaeus | 165/167 |
| 4,572,766 | 2/1986 | Dimitriou | 159/28.6 |
| 5,174,370 | 12/1992 | Hallgren | 165/167 X |
| 5,203,406 | 4/1993 | Blomgren et al. | 165/167 |
| 5,232,557 | 8/1993 | Kontu et al. | 159/28.6 X |

*Primary Examiner*—Leonard R. Leo
*Attorney, Agent, or Firm*—Fish & Richardson

[57] ABSTRACT

A plate heat exchanger for evaporation of a liquid includes a number of thin heat transfer plates (4), provided with corrugation pattern in the form of ridges and grooves, which in each second plate interspace for supply of said liquid have several inlet openings (18) distributed horizontally across the width of the heat transfer plates. The heat transfer plates each have a horizontal portion (28) having less pressing depth that the rest of the corrugation pattern, which is formed such than the heat transfer plates (4) in the area of the portions (28) referred to, abut against each other in the plate interspaces for said liquid and are separated from each other in the plate interspaces for a heating fluid.

9 Claims, 3 Drawing Sheets

DISTRIBUTION PATTERN OF A PLATE HEAT EXCHANGER

The present invention refers to a plate heat exchanger for evaporation of a liquid, comprising a number of vertically orientated and against each other abutting thin heat transfer plates, provided with pressed corrugation pattern in the form of ridges and grooves, and between the heat transfer plates arranged gaskets or the like, which in each second plate interspace delimit a flow space for said liquid and in the remaining plate interspaces delimit flow spaces for a heating fluid, and in each of the flow spaces for the liquid there are several inlet openings horizontally distributed across the width of the heat transfer plates for supply of said liquid.

Through GB 1299481, GB 1412414, GB 1425176 and WO 91/06818 plate heat exchangers in the form of falling film evaporators are previously known, which in the flow space for the liquid show a number of openings for inflowing liquid, as for instance milk or saltwater to be desalted. In connection to these inlet openings between the heat transfer plates one or a small amount of relatively narrow rills of liquid appear. These narrow rills shall later be divided so that the flow or parts of the flow will be spread to an unbroken liquid film across the width of the heat transfer plates.

For certain applications a completely even distribution of the liquid film is tried to be obtained. In other cases a certain maldistribution with larger flow per unit of width on certain parts of the plate and lower on other parts may be optimum depending on downstream conditions. Such uneven flow distributions may on one hand be obtained by varying the relative flow of the different rills or by spreading the location of the rills unequally across the width so that rills lying closely together correspond to a larger flow per unit of width.

Along the heat transfer surface of a falling film evaporator the liquid flow is gradually evaporated and it will be difficult to maintain a completely covering liquid film. To avoid dry surface portions the right flow distribution must be achieved already in the upper part of the heat transfer plates. This flow need not be evenly distributed, but it should cover completely.

Thus, in connection with falling film evaporators usually all of the heat transfer surface should be covered by liquid film, to avoid that dry parts will appear on the heat transfer surface, which gives no or insignificant heat transfer. If the liquid to be evaporated also contains non-evaporative products, a contamination of the heat transfer plates may occur, especially in or at dry areas. In case of concentration of milk products strong hard-removable contamination may occur, so called fouling.

In connection with known falling film evaporators where the liquid flows in the upper part of the plate interspaces, in the shape of a number of narrow rills, a certain height of the heat transfer surface is required to fully distribute these rills across the width of the plates. Thus, dry areas arise between the rills. In such cases when the liquid has not become fully distributed across the width of the plates, before the main evaporation begins, undesired contamination and fouling can occur in these dry areas.

The object of the present invention is early to attain a fully covering distribution of the liquid across the width of the heat transfer plates in a plate heat exchanger of the described kind. An additional object is that said distribution shall be attained without an increasing flow resistance for the heating fluid in its flow space.

These objects are obtained by adjacent heat transfer plates having opposite located horizontally extended portions, which show a corrugation pattern having essentially less pressing depth than the remaining part of the corrugation pattern of the heat transfer plates, that the ridges in said portions of two adjacent heat transfer plates are crosswise arranged and that the corrugation patterns are so designed that the heat transfer plates in said portions via the crosswise arranged ridges, abut against each other in the flow space for said liquid, but are essentially separated from each other in the flow spaces for the heating fluid.

Preferable said portion is located directly below the inlet openings for the liquid.

With the present invention an essentially better distribution of the liquid is achieved. A fully covering, thin liquid film can be obtained early in the flow space for the liquid, simultaneously as the flow resistance decreases for the heating fluid, compared with known technic.

Figure 2:
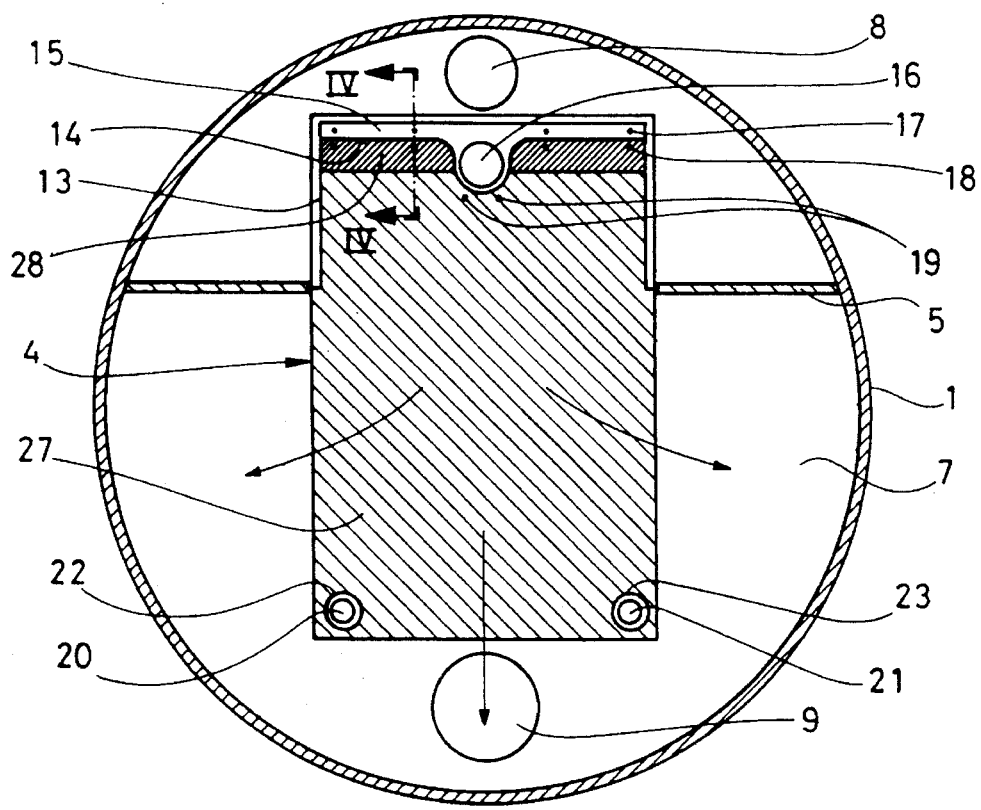
Figure 3:
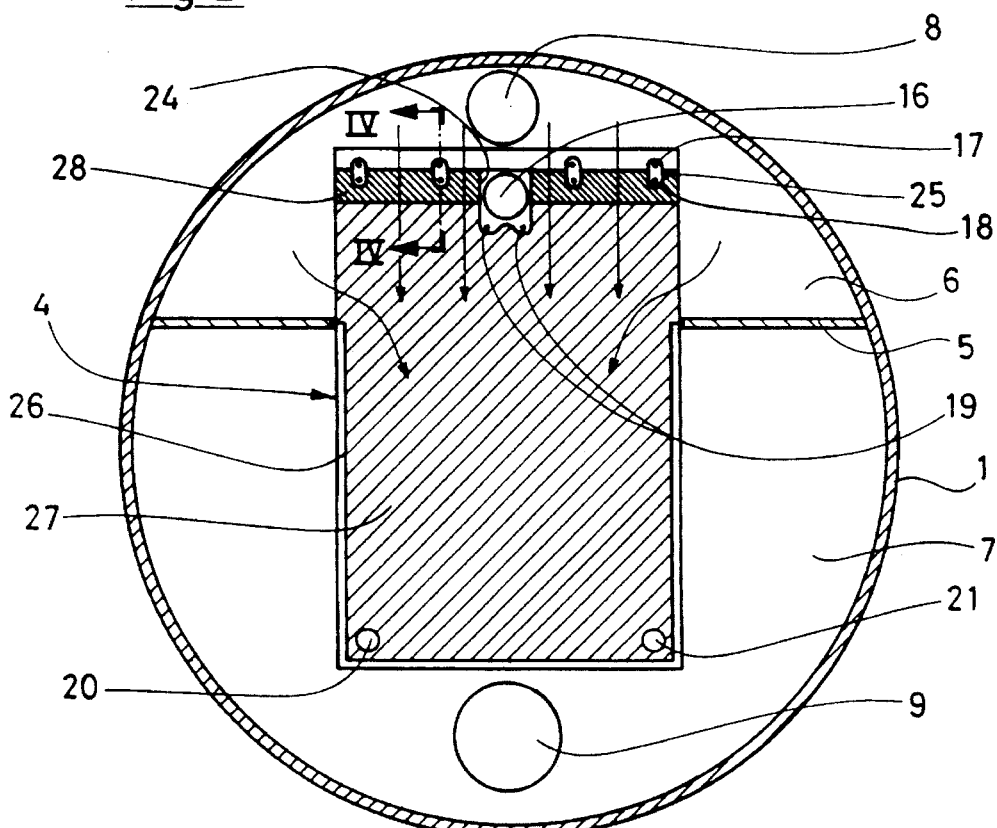
Figure 4:
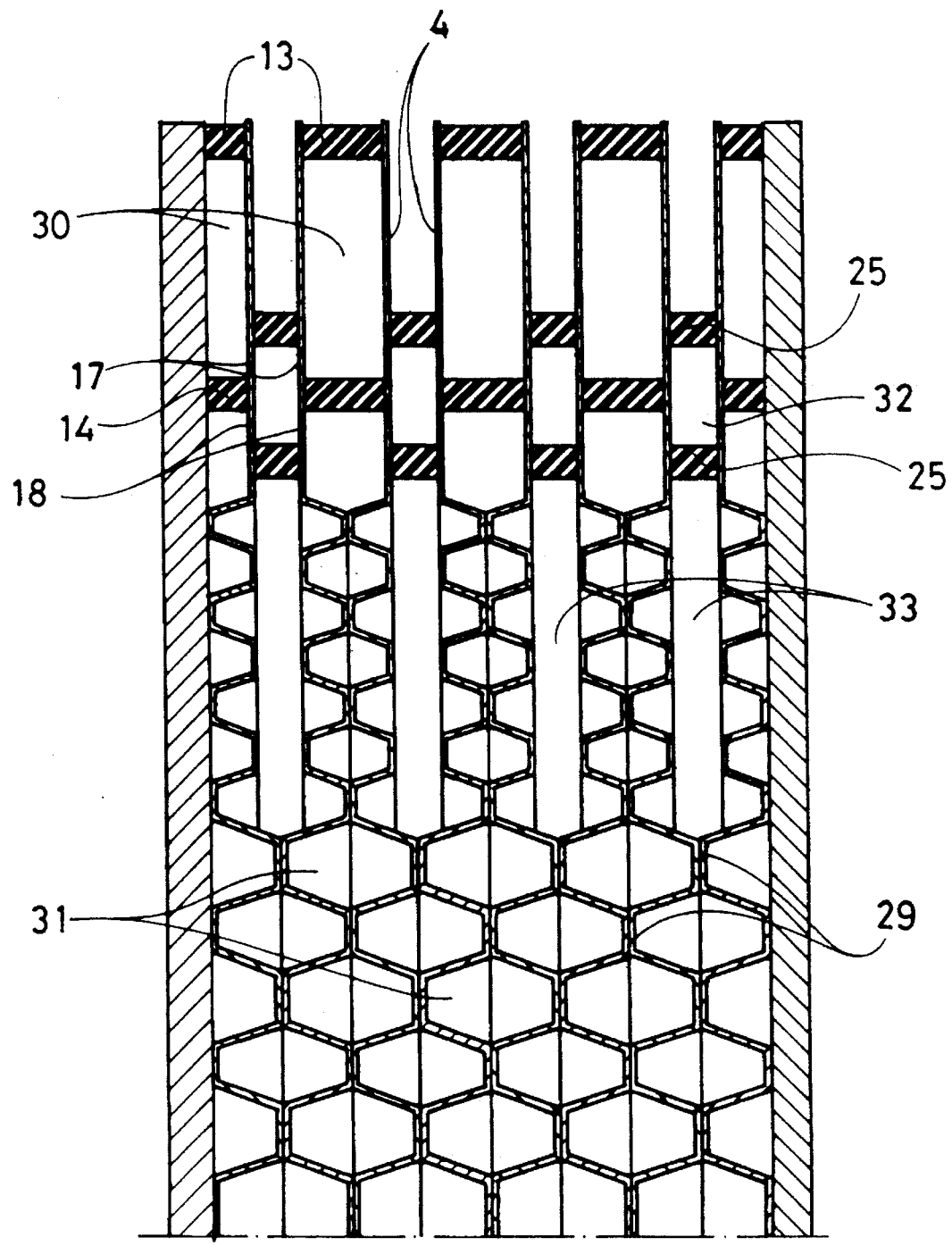

The invention will be described closer in the following with reference to the accompanying drawings, in which FIG. 1 shows a cross-sectional view of a container having a plate heat exchanger arranged therein, FIG. 2 shows a cross-sectional view along the line II—II in FIG. 1, FIG. 3 shows a cross-sectional view along the line III—III in FIG. 1, and FIG. 4 shows a cross-sectional view through the upper part of the plate heat exchanger according to FIG. 1, along the line IV—IV in FIGS. 2 and 3.

The plate heat exchanger shown in FIG. 1 is arranged in a container 1 and comprises two end plates 2 and 3, and a package of thin heat transfer plates 4. The heat transfer plates 4 are by pressing provided with a corrugation pattern in the form of ridges and grooves. Between the heat transfer plates gaskets or the like are arranged, which in each second plate interspace delimit a flow space for liquid and in remaining plate interspaces delimit flow spaces for a heating fluid. In each of said flow spaces for the liquid several inlet openings are distributed horizontally across the width of the heat transfer plates.

The heat transfer plates and the end plates are held together in a conventional manner by a frame (not shown) or in any other known manner, such as by welding, soldering etc.

A horizontal partition 5 around the plate heat exchanger divides the container 1 in an upper chamber 6 and a lower chamber 7. The upper chamber 6 has an inlet 8 for heating fluid and the lower chamber 7 has an outlet 9 for vapour, which is generated in the plate heat exchanger. In addition an outlet 10 from the lower chamber 7 is intended for non evaporated liquid.

Through one end wall of the container a pipe 11 extends, forming an inlet to the plate heat exchanger for liquid, to be evaporated therein, and two pipes 12, forming outlets for the heating fluid.

In FIG. 2 a first side of a heat transfer plate 4 is shown. As appears the heat transfer plate has an elongated rectangular shape and is vertically arranged in the container 1. The partition 5 extends from each of the long sides of the heat transfer plates 4 horizontally towards the circumference of the container 1.

The heat transfer plate 4 has a first gasket 13, which extends along the edge of the heat transfer plate upwards from the partition 5 at one long side of the plate, and then along the upper short side of the plate and back downwards along the other long side of the plate to the partition 5.

A second gasket 14 extends in parallel with the upper short side of the heat transfer plate between the vertical portions of the gasket 13, so that an area 15 of the upper part of the plate is completely surrounded by the gaskets 13 and 14. In the area 15 the heat transfer plate 4 has a through opening 16. All of the openings 16 form an inlet passage through the package of heat transfer plates 4, communicating with the previously mentioned inlet 11.

In addition to the opening 16 each heat transfer plate has in the area 15 and close to the gasket 14 four smaller holes 17 distributed across the width of the plate. Vertically below each of the holes 17, on the opposite side of the gasket 14, there is an inlet opening 18, in the shape of a through hole, for supply of liquid. Finally, close to the opening 16 there are two small through holes 19 located below the gasket 14 for supply of liquid to be evaporated.

Of course the inlet openings 18 for supply of liquid may also be composed of nozzles or holes, extending directly through the gasket 14.

Each heat transfer plate 4 has in their lower corners two through holes 20 and 21, which on the plate side shown in FIG. 2 are surrounded by two annular gaskets 22 and 23, respectively. The holes 20 and 21 in the plates form two passages through the package of plates, which communicate with the outlet 12 of the plate heat exchanger for heating fluid.

In FIG. 3 a second side of the heat transfer plate 4 is shown, and in the upper part of the plate the opening 16 and the two small holes 19 are surrounded by a first gasket 24. Furthermore, there are in the upper part of the plate four horizontally spaced gaskets 25. Each of these surrounds a small area of the plate, in which there is provided both a hole 17 and an inlet opening 18.

In the lower part of the plate a gasket 26 extends along the plate edge downwards from the partition 5 at one long side of the plate, and then along the lower short side of the plate and back upwards along the other long side of the plate to the partition 5. The holes 20 and 21 at the lower corner of the plate are located within the gasket 26.

By arranging the heat transfer plates 4 so that their first sides abut against each other and their other sides abut against each other, i.e. each second plate are turned 180° around its vertical axis, the ridges of the corrugation pattern of two adjacent heat transfer plates 4 will cross and abut against each other, so that supporting means 29 are formed between the plates.

As appears from FIGS. 2 and 3 the heat transfer plates 4 are provided with a heat transfer portion 27, having a certain corrugation pattern. An angle between crossing ridges of the corrugation pattern in the heat transfer portion 27, seen in the flow direction for the gradually evaporated liquid, is about 45°–55°, which is suitable for evaporation, and the pressing depth is preferably about 5 mm. On each side of the opening 16 the heat transfer plates 4 are provided with a horizontally narrow portion 28, having less pressing depth than the corrugation pattern in the heat transfer portion 27. A suitable angle between crossing ridges of the corrugation pattern in the horizontal portion 28, in said flow direction for liquid, is about 60°–80°, and the pressing depth is about 3 mm, which is an optimum for distribution of water.

The horizontal portion 28 is preferably located close to the inlet openings 18 for liquid and before the heat transfer portion 27, in said flow direction for liquid. Naturally, the horizontal portion 28 may cause some effect to the distribution of the liquid irrespective of where it is located between the inlet openings 18 and the outlets for liquid and generated vapour. In connection with falling film evaporation the portion 28 is located directly below the inlet openings 18.

In FIG. 4 a cross-section is shown through the upper parts of a number of heat transfer plates 4, in which said supporting means 29 appear. In each second plate interspace the upper part of the gasket 13 and the gasket 14 are shown. Between the gaskets 13 and 14 in each such plate interspace there is formed a distribution chamber 30, which extends across the whole width of the heat transfer plates 4. The distribution chamber 30 communicates with the passage through the package of plates, which is formed by the openings 16 in the plates.

Below the gaskets 14 said horizontally extended portions 28 are located close to the inlet openings 18 for the liquid, and below the portions 28, in each second plate interspace, one actual evaporation space 31 is formed. Each evaporation space 31 is closed from communication with the upper chamber 6 of the container 1 by the vertical parts of the gasket 13, but communicates below the partition 5 with the lower chamber 7 of the container 1 via the gaps between the edges of the heat transfer plates.

In FIG. 4 the gasket 25 is shown in each of the remaining plate interspace, which together with the two heat transfer plates form a transferring chamber 32. Outside of the gasket 25 in the interspace between the two heat transfer plates a space 33 is formed. The space 33 has in the area of said horizontal portion 28 a comparably low flow resistance, since the heat transfer plates 4 do not abut against each other. The space 33 communicates with the upper chamber 6 of the container 1 via the gaps between the two heat transfer plates along the upper sides of these. A heating fluid in the chamber 6 thus may flow into each space 33 partly from both sides of the package of plates and partly from above via the interspaces between adjacent gaskets 25.

Each space 33 is closed from communication with the lower chamber 7 of the container 1 by the gasket 26.

All of the plate interspaces, forming spaces 33, as well as the upper chamber 6 of the container 1, are by means of the gaskets 24 closed from communication with the passage through the package of plates, which is formed by the openings 16 in the heat transfer plates.

Each distribution chamber 30 communicates via opposite holes 17 in two adjacent heat transfer plates with two transferring chambers 32. Via opposite inlet openings 18 in the same heat transfer plates said two transferring chambers 32 communicate with the evaporation space 31, which is formed between the two heat transfer plates.

The apparatus according to FIGS. 1–4 is intended to operate in the following way:

Liquid to be evaporated is supplied via the inlet pipe 11 (FIG. 1) to the passage through the package of heat transfer plates, which is formed by the openings 16 in the plates. From this passage the liquid flows further out into the different distribution chambers 30 (FIG. 4), which extend across the whole width of the heat transfer plates (see the area 15 in FIG. 2). From the distribution chambers 30 the liquid flows through the holes 17 in the plates into the different transferring chambers 32, and from there, via the inlet openings 18 out into the flow space between the heat transfer plates 4, in which the liquid in the area of said horizontal portion 28 is distributed across the width of the heat transfer plates. The liquid then flows into the actual evaporation spaces 31. Liquid flows simultaneously directly into the evaporation spaces 31 via the holes 19, from the plate interspaces, in which the gaskets 24 (FIG. 3) surround the openings 16 and the holes 19. In the evaporation spaces 31 the liquid then flows downwards in thin layers along the heat transfer plates, covering the opposing surfaces thereof.

The heating fluid is simultaneously supplied to the upper chamber 6 in the container 1 via the inlet 8. The heating fluid consists preferably of steam, which condensates during the heat transfer, but a liquid may also be used as heat transfer fluid. The heating fluid flows in the space 33 via the gaps between the edge of the heat transfer plates, as illustrated in FIG. 3. The heating fluid causes evaporation of the liquid, flowing down along the opposite sides of the plates in the evaporation spaces 31. Vapour formed in the evaporation spaces 31 leaves these and flows out in the lower chamber 7 of the container 1 towards both sides and downwards, as illustrated by means of arrows in FIG. 2. The generated vapour leaves the chamber 7 via the outlet 9, while non evaporated liquid is collected on the bottom of the container 1 and is discharged via the bottom outlet 10 (FIG. 1).

The heating fluid flows downwards along the heat transfer plates and leaves the flow space via the two passages, which are formed by the holes 20 and 21 in the lower parts of the heat transfer plates. These passages are closed from communication with the evaporation spaces 31 by the gaskets 22 and 23 (FIG. 2).

Through the present invention a number of advantages are achieved, that is a better flow distribution, i.e. an even liquid film is formed up to an angle which is insignificantly less than the angle between crossing ridges, in the flow direction, and with a relative low height of said portion 28, a completely covering liquid film, having relatively even flow distribution is achieved if the distance between the inlet openings 18 is less than $$2 \times H \times \tan\phi$$

where H is the height of the portion 28 and $\phi$ corresponds to the spreading angle of the liquid flow. A corresponding even and entire liquid film should require an essentially larger distance in a heat transfer portion 27, with a ground pattern having higher pressing depth and lower angle between the crossing ridges, in the flow direction.

In addition, a relatively low pressure drop, i.e. low flow-resistance, is achieved in the flow spaces 33. The heat transfer plates are in the area of said portions 28 essentially separated from each other, i.e. the number of supporting means between the heat transfer plates are considerably less, compared with conventional plate heat exchangers. The pressure drop is directly depending on the number of supporting means between the heat transfer plates.

A relatively high heat transfer on the evaporation side is attained, partly since a very small part of the heat transfer surface in the upper portion of the heat transfer surface is dry, partly because the liquid film is thin on the outwardly curved parts of the pattern depending on its small partition and high influence on the surface tension, and partly because the convective part of the coefficient of heat transfer for the evaporation is comparably large, during the present conditions of the two phase pressure drop, despite a relatively small flow of vapour formed close to the flow inlet, since the pressing depth is low and the angle between crossing ridges, in the flow direction, is high. The high coefficient of heat transfer generates relatively large amounts of vapour, whereupon the convective part of the heat transfer further downstream becomes still higher.

To provide a heat transfer plate 4 in accordance with the invention with a portion 28, which shows lower pressing depth and which completely lacks supporting means in the plate interspaces where no evaporation occurs, may in certain applications be unfavourable. Especially if it does not exist any essential overpressure in this plate interspace compared to the conditions on the plate interspace of the evaporation side.

This problem may be solved in several ways. For example the height of said portion 28 can be small. Separate supporting means toward the other side may be formed in the corrugation pattern. Said portion 28 can be divided, horizontally along the heat transfer plate, in several parts, e.g. one part for each inlet opening 18. In hygienic cases, e.g. in connection with concentration of milk or juice, wedge-shaped areas, having lower pressing depth, may be arranged close to the inlet openings with the apex of the wedge turned upwards. The wedge-shaped areas are formed such that the angle of the wedge is equal to or less than the maximum spreading angle of the liquid flow, and where adjacent wedge-shaped areas along the length of the plate diverge to a continuously horizontal area, to distribute the liquid into a thin liquid film, without formation of dry areas between the inlet openings 18 in the upper area before the liquid film has managed to spread.

The space between the wedge-shaped areas may be sealed from liquid, e.g. by filling the intermediate parts with inserted gaskets or by welding.

In climbing film evaporation as well as in falling film evaporation an essential pressure drop at the inlet of the liquid (preferably in a non heat transfer portion) may act stabilizing against static and dynamic instability between the different flow spaces and thereby provide an even distribution. The pressure drop may be provided by a portion with less pressing depth, in accordance to the invention, located at the inlet of a flow space.

In connection with climbing film evaporation a portion located immediately downstream of the evaporation inlet in the flow space also can be favourable, in that a better distribution of inflowing liquid is accomplished with larger angle between crossing ridges, in the flow direction, and lower locally pressing depth. Particularly in combination with several equally distributed flow inlets to the plate interspace. One or several parallel thin stripes, e.g. having an elongated wedge-shaped extension, especially in combination with an obtuse angle between crossing ridges, in the flow direction, and lower locally pressing depth can provide a relatively larger pressure drop at the inlet. This will lead to a good distribution across the width of the plate and prevent the tendency of static or dynamic instability between parallel passages or parts thereof.

I claim:

1. Plate heat exchanger for evaporation of a liquid, comprising a number of vertically oriented and against each other abutting thin heat transfer plates (4), provided with a pressed corrugation pattern in the form of ridges and grooves, and between the heat transfer plates (4) arranged gaskets (13, 14, 16, 25), defining a plurality of plate interspaces, each second plate interspace delimiting a flow space for said liquid and the plate interspaces adjacent each second plate interspace delimiting flow spaces for a heating fluid, in each of the flow spaces for the liquid there being several inlet openings (18) horizontally distributed across the width of the heat transfer plates for supply of said liquid, characterized in that adjacent heat transfer plates have opposite located horizontally extended portions (28), which show a corrugation pattern having essentially less pressing depth than the remaining part of the corrugation pattern of the heat transfer plates, that the ridges in said portions (28) of two adjacent heat transfer plates (4) are crosswise arranged and that the corrugation patterns are so designed that the heat transfer plates (4) in said portions (28), via the crosswise arranged ridges, abut against each other in the flow space for said liquid, but are essentially separated from each other in the flow space for the heating fluid.

2. Plate heat exchanger according to claim 1, characterized in that said portions (28) of the heat transfer plates (4) are located close to the inlet openings (18) for the liquid.

3. Plate heat exchanger according to claim 1, characterized in that the corrugation pattern in said portion (28) of a heat transfer plate (4) shows a smaller partition than the remaining corrugation pattern.

4. Plate heat exchanger according to claim 1, characterized in that the corrugation pattern in said portion (28) of a heat transfer plate (4) is formed such that it provides larger flow resistance for said liquid than provided by the remaining corrugation pattern.

5. Plate heat exchanger according to claim 1, characterized in that said portion (28) of a heat transfer plate (4) has a vertical extension which is less than the distance between the inlet openings (18).

6. Plate heat exchanger according to claim 1, characterized in that said portion (28) of a heat transfer plate (4) having separate projections pressed to full pressing depth so that supporting means are formed between the plates in said remaining flow spaces.

7. Plate heat exchanger according to claim 1, characterized in that said remaining flow spaces having inlets for a heating fluid, such as steam.

8. Plate heat exchanger according to claim 1, characterized in that said inlet for the heating fluid is so located, that the fluid and said liquid will have essentially the same flow direction through said portions (28) in the respective flow space.

9. Plate heat exchanger according to claim 1, characterized in that the angle between each other crossing ridges of said portions (28), in the flow direction of said liquid is 60°–80° and that the pressing depth is about 3 mm.

* * * * *